United States Patent [19]
Whittemore et al.

[11] Patent Number: 5,925,309
[45] Date of Patent: *Jul. 20, 1999

[54] METHOD FOR THE EXTRUSION OF CERAMIC FILTER MEDIA

[75] Inventors: Osgood J. Whittemore; Chris J. Adams, both of Seattle; Daniel J. Vorhis, Freeland, all of Wash.

[73] Assignee: Mountain Safety Research, Seattle, Wash.

[ * ] Notice: This patent is subject to a terminal disclaimer.

[21] Appl. No.: 08/904,582

[22] Filed: Aug. 6, 1997

Related U.S. Application Data

[63] Continuation of application No. 08/514,032, Aug. 11, 1995, Pat. No. 5,656,220.

[51] Int. Cl.$^6$ .................................................. B29D 23/00
[52] U.S. Cl. .............................. 264/628; 264/43; 264/44; 264/632; 264/634; 264/638; 264/639; 264/678; 264/679; 264/150; 264/177.11; 264/211.11; 55/523; 55/DIG. 5; 210/510.1; 502/412; 502/439
[58] Field of Search ................................ 264/43, 44, 605, 264/628, 632, 634, 638, 639, 669, 678, 679, 150, 176.1, 177.11, 211.11; 106/481, 482, 672, 681; 55/523, DIG. 5; 210/510.1; 501/80; 502/412, 439

[56] References Cited

U.S. PATENT DOCUMENTS

| | | |
|---|---|---|
| 1,785,457 | 12/1930 | Pfohl . |
| 2,248,490 | 7/1941 | Chamberlain et al. . |
| 2,554,705 | 5/1951 | Jewell . |
| 2,682,696 | 7/1954 | Milliken . |
| 2,795,027 | 6/1957 | Rossier . |
| 3,210,449 | 10/1965 | Talalay et al. . |
| 3,393,256 | 7/1968 | Zambernard ............................ 264/639 |
| 3,689,611 | 9/1972 | Hardy et al. ............................ 264/44 |
| 4,274,825 | 6/1981 | North . |
| 4,486,369 | 12/1984 | Schafler et al. . |
| 4,496,501 | 1/1985 | Linke et al. . |
| 4,540,535 | 9/1985 | Tomita et al. ............................ 264/44 |
| 4,628,615 | 12/1986 | Verheyden . |
| 4,725,391 | 2/1988 | Bardhan et al. . |
| 5,009,825 | 4/1991 | Lurie . |
| 5,205,991 | 4/1993 | Avery et al. . |
| 5,227,105 | 7/1993 | Eucker et al. . |
| 5,326,512 | 7/1994 | Stillwagon et al. ....................... 264/44 |
| 5,350,551 | 9/1994 | Shino . |
| 5,382,396 | 1/1995 | Lee et al. . |

FOREIGN PATENT DOCUMENTS 94-6435   7/1994   Rep. of Korea .

OTHER PUBLICATIONS

Dr. Gilbert C. Robinson, "Additives Assist Fabrication of Ceramics," *Ceramic Industry*, Apr. 1992, pp. 53–55.

J.P. Lorains, V. W. Bentley, "German Porous Ceramic Industry," British Intelligence Objectives Sub–Committee, Oct. 29, 1945.

Alfred B. Seatle, "An Encyclopaedia of the Ceramic Industries," vol. 1. 1929.

*Primary Examiner*—Peter Chin
*Assistant Examiner*—Michael P. Colaianni
*Attorney, Agent, or Firm*—Foster & Foster

[57] ABSTRACT

A method of manufacturing ceramic filter media for water filters involves the steps of mixing a plurality of raw ceramic materials and a plurality of extrusion-aid materials to form a mixture of constituent materials, extruding the constituent materials to form tubular filter media, drying the tubular filter media, and firing the tubular filter media to create ceramic tubular filter media. The step of drying the tubular filter media preferably comprises placing the tubular filter media on top of rotating rollers which dries the tubular filter media evenly and preserves the desired characteristics of the tubular filter media.

5 Claims, 4 Drawing Sheets

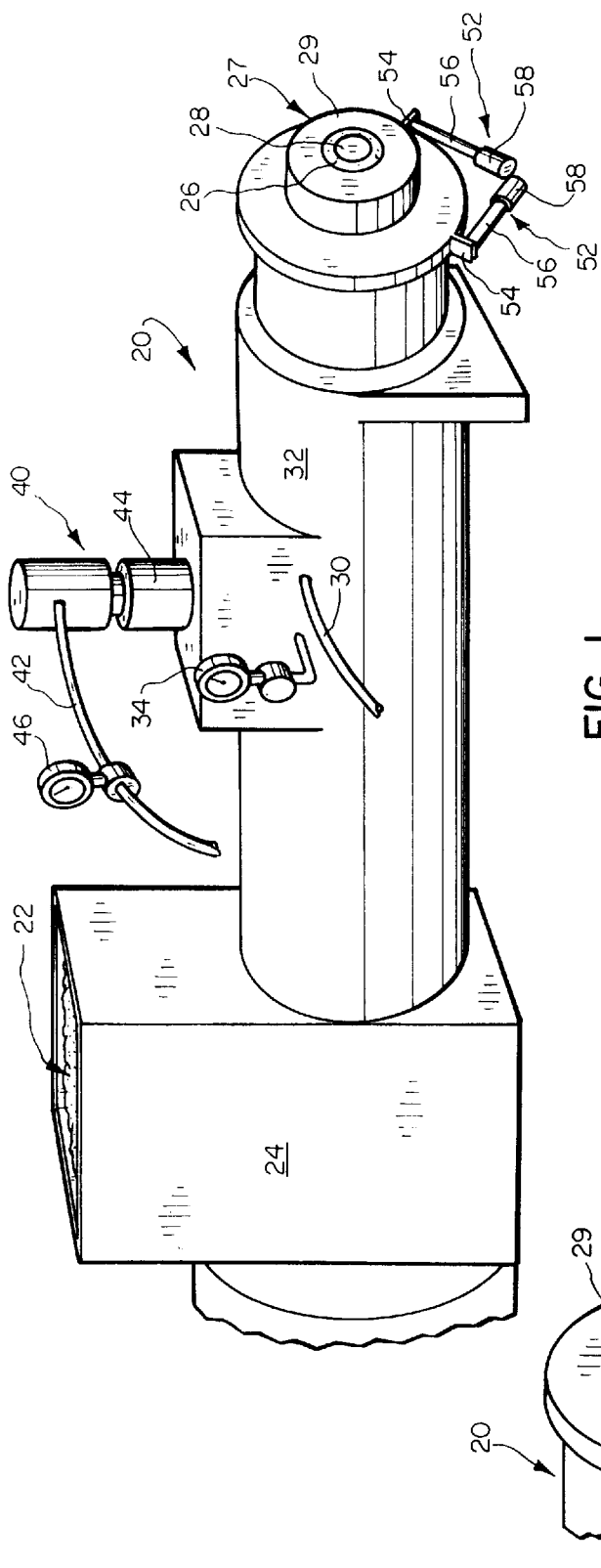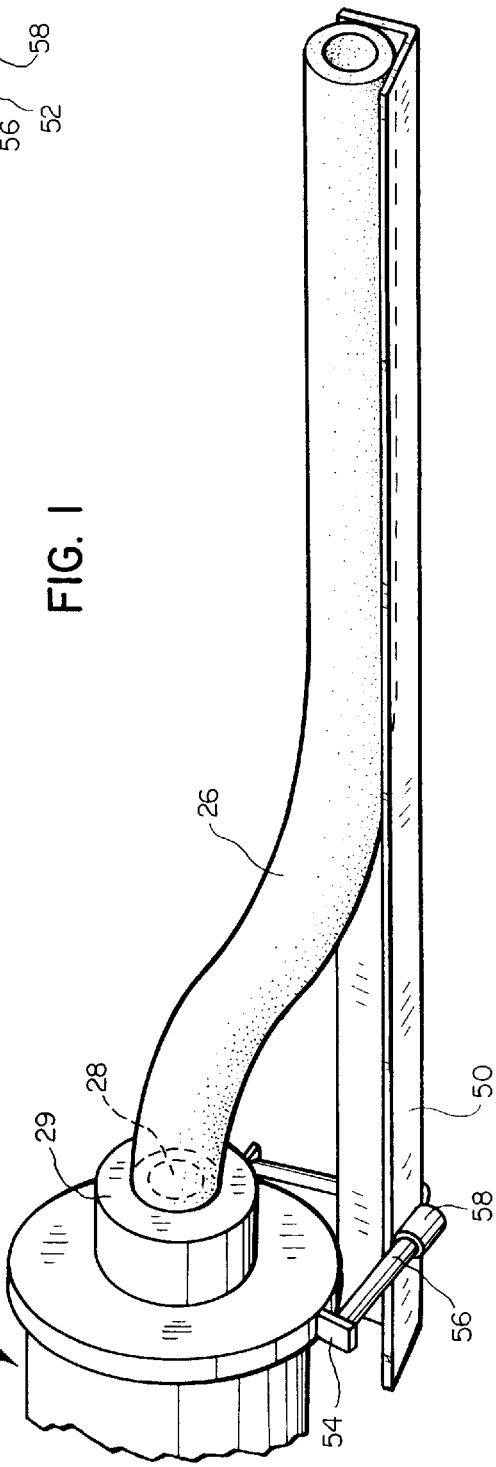

METHOD FOR THE EXTRUSION OF CERAMIC FILTER MEDIA

RELATED APPLICATION

This is a continuation of U.S. patent application Ser. No. 08/514,032, filed Aug. 11, 1995, now U.S. Pat. No. 5,656,220.

TECHNICAL FIELD

This invention relates to manufacturing processes for filter media, and more particularly, to manufacturing processes for ceramic filter media used in connection with water filters.

BACKGROUND OF THE INVENTION

The benefits of ceramic filter media for specific uses of water filtering are well established. Ceramic filter media provides acceptable filtration and has a long life relative to other filter media. There have been, however, many challenges to producing economically a high quality ceramic filter for water filters, such as portable water filters, home water filters, and water filters for industrial use. A number of design criteria must be satisfied in order to produce a high quality ceramic filter media suitable for water filtration. For many types of water filtration, a high level of dimensional control must be maintained. The length of the filter media must be precisely cut for use in the particular filter media housing. The inside and outside diameters must be within a narrow tolerance range. This becomes particularly important where, as with ceramic filter media, the media is cleaned by abrasion, and the useful life of the filter media is determined by the external dimensions of the ceramic filter.

One traditional method utilized in manufacturing ceramic filter media is a slip cast method. This method involves the use of a porous mold (commonly made out of gypsum), into which a slurry containing ceramic raw materials is directed. The slurry is generally either a water-based or alcohol-based slurry. Once the slurry has been introduced into the mold, the liquid portion of the slurry is drawn into the mold. A filter cake is formed on the wall of the mold. Upon removal of the structure that remains, including the filter cake, from the mold, the structure is fired in a kiln and a ceramic filter results. This method involves, however, significant manufacturing costs and is unable to achieve high levels of precision in terms of tolerance ranges.

Another method of manufacturing a ceramic filter involves use of ceramic powder. Ceramic powder beads are introduced to pressure and heat through a sintering process. The particles coalesce and a pore structure results. The structure is fired and dipped in an acid. The difficulty in respect to this process relates to the percent porosity. This process reduces the porosity of the filter media and thereby slows down the flow of water through the filter media.

The nature of extrusion processes has heretofore prevented effective manufacturing of ceramic filters for use in water filtering devices. A number of problems have persisted that have prevented use of this technique in manufacturing ceramic filter media using diatomaceous earth. A first major problem involves the need to maintain the desired shape of the extruded material. For portable water filtration, a tubular shape is understood to be the most effective for filtration and longevity of the filter media. The primary constituent in a sintered ceramic filter is silica ($SiO_2$) which is highly abrasive and therefore difficult to pass through an extruding machine. This, combined with the fact that the silica must be urged through a small opening, creates substantial problems with respect to maintaining a particular desired shape, such as a tube. Because of the abrasiveness of silica, the appropriate mixture of non-ceramic, extrusion-aid materials must be utilized and carefully balanced to enable extrusion. If the mixture including extrusion-aid and ceramic raw materials is too dry, the material becomes difficult to extrude. Furthermore, even if it were possible to extrude a particularly dry mixture of ceramic materials, the pores would likely be too small and too compressed to allow proper filtration. On the other hand, a solution that is too aqueous will result in an extruded structure that does not maintain its proper shape.

A second major problem with the extrusion process relates to maintaining the relative desirable characteristics of the constituent materials. The mixture of constituents that will result in a proper ceramic filter media must be mixed a particular way to achieve the desired density of materials. In the extrusion process, the material mixture must flow continuously through the extruder without allowing air pockets to be introduced into the material. Otherwise, flaws may be created in the resulting ceramic filter media.

A third problem relates to the pore size and pore distribution in the resulting filter media. For proper filtration to occur, pore distribution must be even about the cylindrical wall. In addition, the pore size must be proper to enable filtration at an optimum level. Special problems are presented when drying tubular filter media in order to maintain proper pore size and distribution.

As mentioned above, maintaining dimensional controls to ensure that the resulting ceramic filter media falls within an acceptable range of tolerances is essential. Provided the foregoing problems with respect to the extrusion process can be overcome, as indeed is the case in the present invention, utilizing the extrusion process to produce filter media will provide the acceptable dimensional control and significantly reduce production costs.

Another primary advantage of using an extrusion process for manufacturing sintered diatomaceous ceramic filters is the uniformity of material. Because the constituent materials are thoroughly mixed prior to extrusion, the filter media material that results as highly uniform and is highly suitable for filtering water.

Another advantage to utilizing extrusion in the process of manufacturing ceramic water filters is that the resulting filter media requires no secondary machining. In contradistinction, the filter media produced by the slipcast method requires machining and milling in order to achieve acceptable tolerance ranges depending upon the end uses for the filter, such as portable water filtration cartridges which require a measurement gage to determine the useful life of the filter media. Furthermore, extrusion requires fewer manufacturing steps than slipcasting. Extrusion also provides the ability to manufacture a wide variety of filter media lengths and sizes with little expense. The end result is that it would be much less expensive to manufacture a sintered diatomaceous ceramic filter using an extrusion process as compared to prior known processes such as slipcasting.

In view of the foregoing, there is a substantial need to produce a ceramic filter media through use of an extrusion process so that suitable dimensional control and other desired characteristics of filter media can be maintained and to reduce the cost of manufacturing the ceramic filter media.

SUMMARY AND OBJECTS OF THE INVENTION

It is an object of the invention to provide a method of manufacturing a ceramic filter media that involves an extrusion process.

Another object of the invention is to provide a method of manufacturing an extruded ceramic filter media that maintains dimensional controls so that the filter media can be used in a particular water filter.

Another object of the invention is to provide a ceramic media manufacturing process in which the ceramic materials are extruded, yet in which desired characteristics of the filter media, including shape, pore size, and pore density, are maintained throughout the steps of extrusion, drying, and firing.

Still another object of the invention is to provide a drying process in which a cylindrical, tubular extruded filter media is dried gradually and evenly to maintain the dimensional integrity of the filter media material.

Yet another object of the invention is to provide a manufacturing process for producing ceramic filter media that is less expensive.

Another object of the invention is to provide a manufacturing process for producing ceramic filter media that involves an extrusion process and overcomes the difficulties of extruding silica as a component of the material mixture.

The foregoing objects are achieved by a ceramic filter media manufacturing process in which a variety of constituent materials are mixed together in a suitable mixer, such as a muller-type mixer. These constituents include portions of diatomaceous earth, bentonite clay, water, gel, and sodium stearate. The mixed material is introduced into a suitable extruder, such as an auger-type extruder, which produces a cylindrical, tubular filter media. The tubular filter media is placed on top of rotating rollers which cause the tubular filter media to rotate for drying purposes. This promotes even drying and maintains specific tolerances of the tubular filter media being manufactured. In addition, the rollers maintain other desired characteristics of the tubular filter media, including pore size and pore distribution. Subsequently, the tubular filter media is fired in a kiln to remove all non-ceramic materials and create the final form of the tubular ceramic filter media. The sintering process, as is well known, enhances the structural strength of the ceramic filter media. The sintering process also advantageously allows control of the pore size by varying the amount of time the filter media is held in the kiln and the temperature of the kiln. The longer the media is held and the hotter the temperature, the larger the resulting pore size will be in the filter media.

Other objects, features, and advantages of the invention will become apparent from the following detailed description of the invention with reference to the accompanying drawings.

BRIEF DESCRIPTION OF THE DRAWINGS

Preferred embodiments of the invention are described below with reference to the accompanying drawings:

FIG. 1 is a perspective view of an auger-type extruder apparatus utilized in connection with the present invention involving the manufacture of ceramic filter media;

FIG. 2 is a side elevation view of the discharge end of an auger-type extruder apparatus at which tubular filter media is discharged onto a V-shaped support structure;

DETAILED DESCRIPTION OF THE INVENTION

Figure 3:
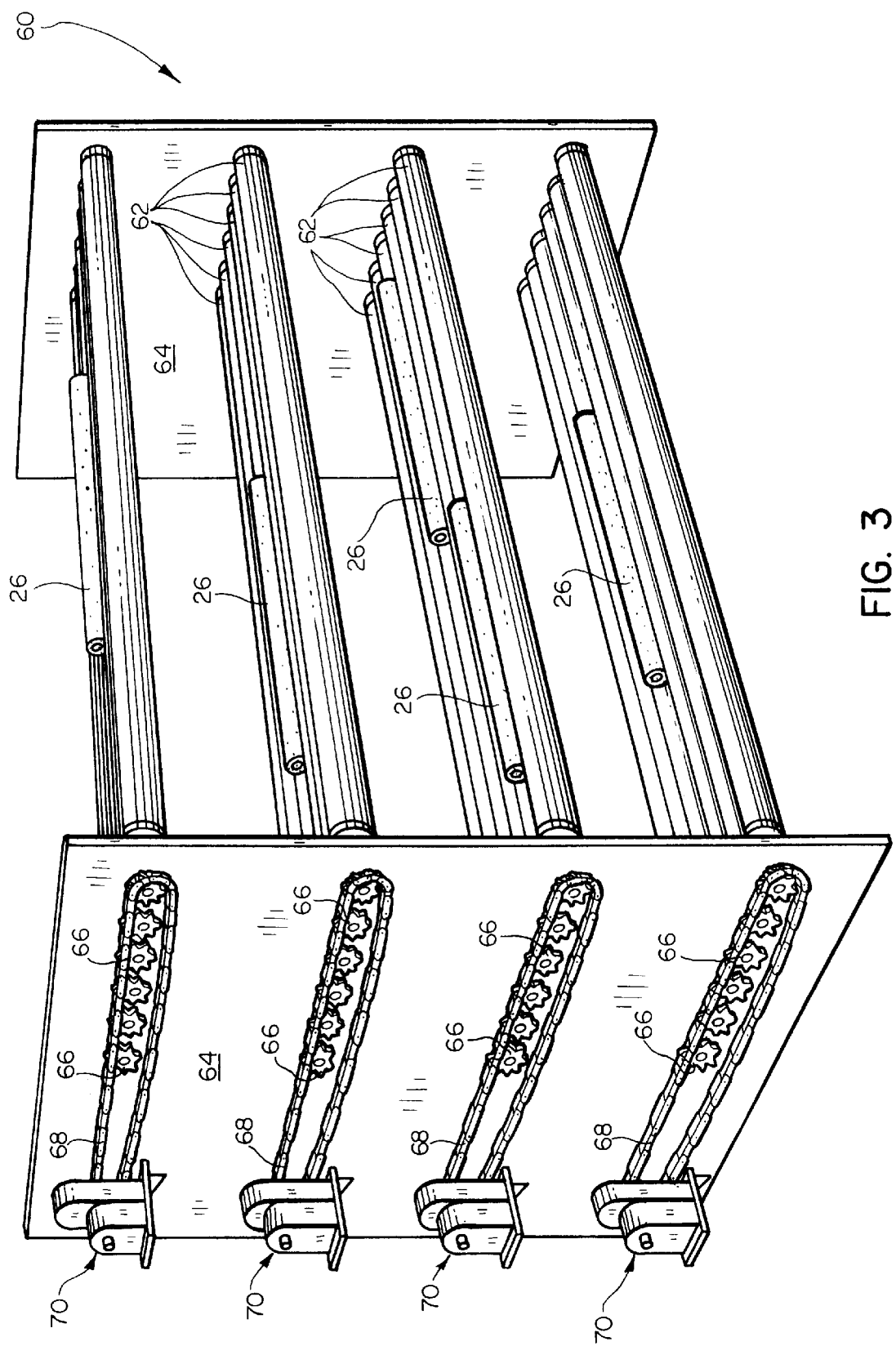
FIG. 3 is an isometric view of a roller-drier apparatus used in connection with the drying step of the ceramic filter media manufacturing process.

The present invention generally involves a novel method of manufacturing of a ceramic filter media. The manufacturing process includes the steps of mixing various materials, including diatomaceous earth material, bentonite clay, and other extrusion-aid materials to form a mixture of constituent materials, passing the mixture of constituent materials through an extruder to form a cylindrical, tubular filter media, placing the tubular filter media on rotating rollers to cause the filter media to rotate and to dry the filter media, and firing the tubular filter media to create a tubular ceramic filter media for use in a particular water filter.

In addressing the aforementioned problems with respect to extruding ceramic raw materials, extensive efforts were made to achieve a combined mixture of ceramic raw materials and other extrusion-aid constituents that would allow extrusion and produce a tubular filter media. One of the specific recipes that achieved the desired results is as follows: 80% dry weight Celite™ 512 diatomaceous earth, 20% dry weight Bentolite™ L3 bentonite clay, 50% dry weight water, 50% by weight of a 5% Methocel™ gel in water, and 0.5% sodium stearate. It should be understood that only diatomaceous earth and clay constitute "ceramic raw materials" and form part of the finalized ceramic filter media. The water, Methocel™ gel, and stearate are extrusion aids only and will all evaporate or degrade during firing at a high temperature required to make the ceramic filter media. It is to be understood that other organic binders and extrusion aid materials, such as without limitation polyvinyl alcohol or xantham gum, may be suitable for the extrusion process. Accordingly, the percents of diatomaceous earth and bentonite clay add to 100% of the dry weight of the ceramic raw materials. The other percentages of the extrusion-aid constituents are based on 100% of the dry weight recipe and add to the total weight of the mixture of constituent materials (which includes the ceramic raw materials).

The gel is preferably prepared using a gel powder. One such suitable gel powder is sold under the trademark Methocel™, a trademark of Dow Chemical Corporation. The gel is created by disbursing the gel powder in hot water, and then quenching it with cold water to form the gel. This is a conventional technique suggested by the manufacturer of Methocel™, Dow Chemical Corporation.

Diatomaceous earth provides the basic raw ceramic material for the filter media. The benefits of using diatomaceous earth in ceramic filters, because of its tortuous pathways and pores, are well known. The specific type of diatomaceous earth used will depend upon the particular end use to which the filter will be applied, such as home point of use (POU), portable POU, or industrial use.

Clay, which may comprise bentonite clay or another type of clay, serves as an extrusion aid, but also forms part of the resulting ceramic filter media. The clay provides plasticity, stiffness, and lubrication during extrusion. Clay also acts as a bonding agent to provide strength to the formed tubular filter media directly after extrusion.

Water serves as an extrusion aid only. It assists the clay in providing lubrication for the extrusion process. It also suspends diatomaceous earth particles to increase porosity in the filter media that forms after the water is removed during the drying process.

The primary function of the gel is to hold together the powder in the mixture of constituent materials. It further assists the clay in adding plasticity and lubrication to the extrusion process.

The sodium stearate primarily assists in lubrication to enable the mixture to pass through the die in the extrusion process.

Once measured in correct proportion, the above-mentioned constituents are added independently to a conventional muller-type mixer. A muller-type mixer is commonly used for such things as mixing raw ceramic materials and for mixing foundry sand. A muller-type mixture utilizes rotating wheels to provide a combined kneading and mixing action. The speed of the mixer must be such that the dense mixture of constituent materials can pull away from the moving pieces. The internal crib must additionally have enough unobstructed space to allow large agglomerations of the mixture to move in and around the muller wheels. Mixing preferably is accomplished over a period of approximately one hour to assure a complete and homogeneous mix. Care should be taken to avoid over-mixing the mixture of constituent materials, since such over-mixing can result in excessive water loss and affect the properties of the resulting ceramic filter media.

FIG. 1 shows a conventional auger-type extruder 20 with a mixture of constituent materials 22 positioned inside of a hopper 24. The extruder produces tubular filter media 26 by drawing material from the hopper and forcing the material through a die 27. The die 27 comprises an outer housing 29 which determines the outer diameter of the tube and a core 28 which determines the inside diameter of the tube. The specific size of the extruded tubular ceramic material must be adjusted to compensate for drying and firing shrinkage, and will of course depend upon the particular end use of the filter.

To maintain the proper density of the mixture during extrusion, and to avoid the interdispersion of air into the mixture of constituent materials, a vacuum hose 30 of a vacuum system is connected to the main extrusion chamber 32 of the auger extruder to remove air. A vacuum gauge 34 monitors the effectiveness of the vacuum system.

An air supply system 40 is attached to the auger extruder apparatus to ensure that an internal air passageway (not shown) is maintained for operation of the vacuum system. Pressurized air is introduced via line 42 into an air motor chamber 44 which cleans an internal passageway to ensure continuous vacuum capability. A positive pressure air gauge 46 is operatively connected to the line 42 to monitor the air pressure introduced into the air supply system. The extrusion speed should be approximately 60 feet per minute or as fast as possible to maintain the shape of the tubular filter media formed by the extruder.

Handling extruded tubular filter media presents specialized problems that must be overcome. The ceramic material in tubular form is delicate and can be easily disfigured by improper handling. Accordingly, as shown in FIG. 2, a specialized handling structure, such as a V-shaped support (angled at approximately 90°) 50 is used to receive the extruded tubular filter media. Although the support device 50 shown in FIG. 2 is intended to be handled by a manual operator, it is to be understood that implementation of a similar automated handling system could be used without departing from the scope of the present invention. The V-shaped member 50 is placed underneath the extruded material and moved along with the tubular filter media as it is ejected from the extruder. A pair of roller assemblies 52 are provided to position the support member 50 underneath the auger extruder 20 so that the V-shaped member can be moved at the same speed at which the extruder discharges the tubular filter media from the dye 27. The roller assemblies are mounted to a portion of the extruder by means of support plates 54 to which elongated rods 56 are attached. Rollers 58 are rotatably coupled to the rods 56 to support the V-shaped member as it is moved underneath the extruding apparatus. It is also to be understood that there are various other ways in which the V-shaped member 50 could be supported to move along with the tubular filter media as it is extruded. Typically, after extrusion of approximately three feet of tubular filter media, the media is cut by means of any conventional manual or automated system.

Figure 4:
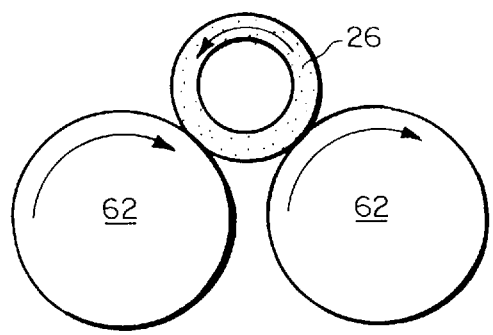
FIG. 4 is a side elevation view of a pair of rotating rollers causing the tubular filter media to rotate according to the drying step of the present invention.

After the ceramic material has been extruded, it is transferred to a roller-drier apparatus 60 (FIG. 3). The roller-drier apparatus involves a plurality of rollers 62 rotatably mounted between opposed support panels 64. A gear 66 is formed at the end of each roller and is exposed to the external side of panel 64 for engagement with a drive chain 68. The drive chain 68 is entrained, in turn, around a drive gear inside a housing of a motor assembly 70. As a result, as shown in FIG. 4, the rollers 62 rotate in one direction (clockwise in FIG. 4) thus causing the ceramic tubular structure 26 to rotate in an opposite direction (counterclockwise in FIG. 4). The roller-drier preferably rotates the ceramic material at a rate of approximately one revolution per minute. A heat source and forced air 61 are introduced through the roller-drier apparatus (preferably from the underside of the assembly) to enable gradual, even drying of the ceramic material. If the roller speed is too rapid, the shape of the ceramic material may be destroyed or unwanted surface blemishes can result. If the revolution rate is too slow, the process may not produce properly dimensioned tubular filter media. The drying step should preferably continue until the tubes do not feel cold to the touch, or until a particular weight loss has been achieved.

Once dry, the tubes are subsequently introduced into a conventional kiln (not shown) for firing. The tubes can be fired either in a vertical or horizontal orientation. Preferably, a firing cycle for the tubes should last approximately twelve hours with maximum temperatures achieving approximately 1832 degrees Fahrenheit. The firing will remove all organic binders and chemicals utilized in the ceramic manufacturing process, such as the gel and sodium stearate. It will also remove any residual water not removed at the roller-drier apparatus location.

Figure 5:
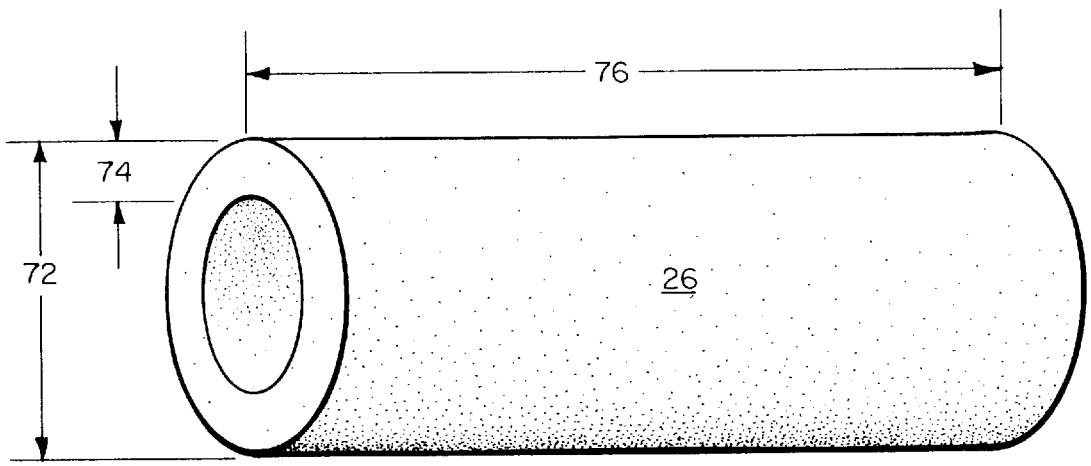
FIG. 5 is an isometric view of a formed, tubular ceramic filter media for use in connection with a particular water filter.

After the tubes have been fired, they are cut to specific lengths to achieve a specifically dimensioned tubular ceramic filter media 26 for use in a water filter, such as a home or portable POU filter, or for an industrial application. For example, a preferred embodiment for a particular portable water filter, as shown in FIG. 5, the outside diameter 72 should be 1.675 inches plus or minus 0.025 inches, the wall thickness 74 should be 0.250 inches plus or minus 0.010 inches, and the length 76 is cut to 3.870 inches plus or minus 0.30 inches. Cutting lengths of the tubular ceramic filter media can be accomplished using woven, bonded, diamond blades, or any other suitable cutting device. Care must be taken to avoid unwanted impurities when woven or bonded plates are used. In the case of diamond blades, care must be taken to cut the ceramic filter media slowly enough to prevent overheating of the blade which otherwise might cause warpage and uneven cutting. Alternatively, wetcutting may be utilized to produce the desired dimensions for the ceramic filter media.

Figure 6:
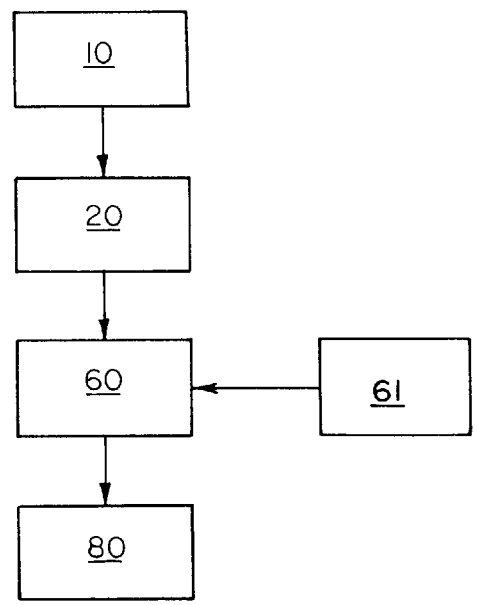
FIG. 6 is a flow chart showing various steps utilized in connection with the method of manufacturing tubular ceramic filter media according to the present invention.

FIG. 6 shows a schematic diagram of one preferred process for manufacturing a tubular ceramic filter media. The mixture of constituent materials is first mixed together at a mixer location 10 using a muller-type mixer. The mixture of constituent materials is then transferred to an extruder 20 (described in detail in connection with FIGS. 1 and 2) for producing tubular filter media. Subsequently, the tubular filter media is transferred to a roller-drier apparatus 60 (explained in detail in connection with FIG. 3) for drying using the heat source and forced air 61. Lastly, the dried tubular filter media are positioned inside a kiln 80 for firing. The resulting ceramic filter media can thereafter be cut to specific lengths for use in a particular water filter.

Figure 7:
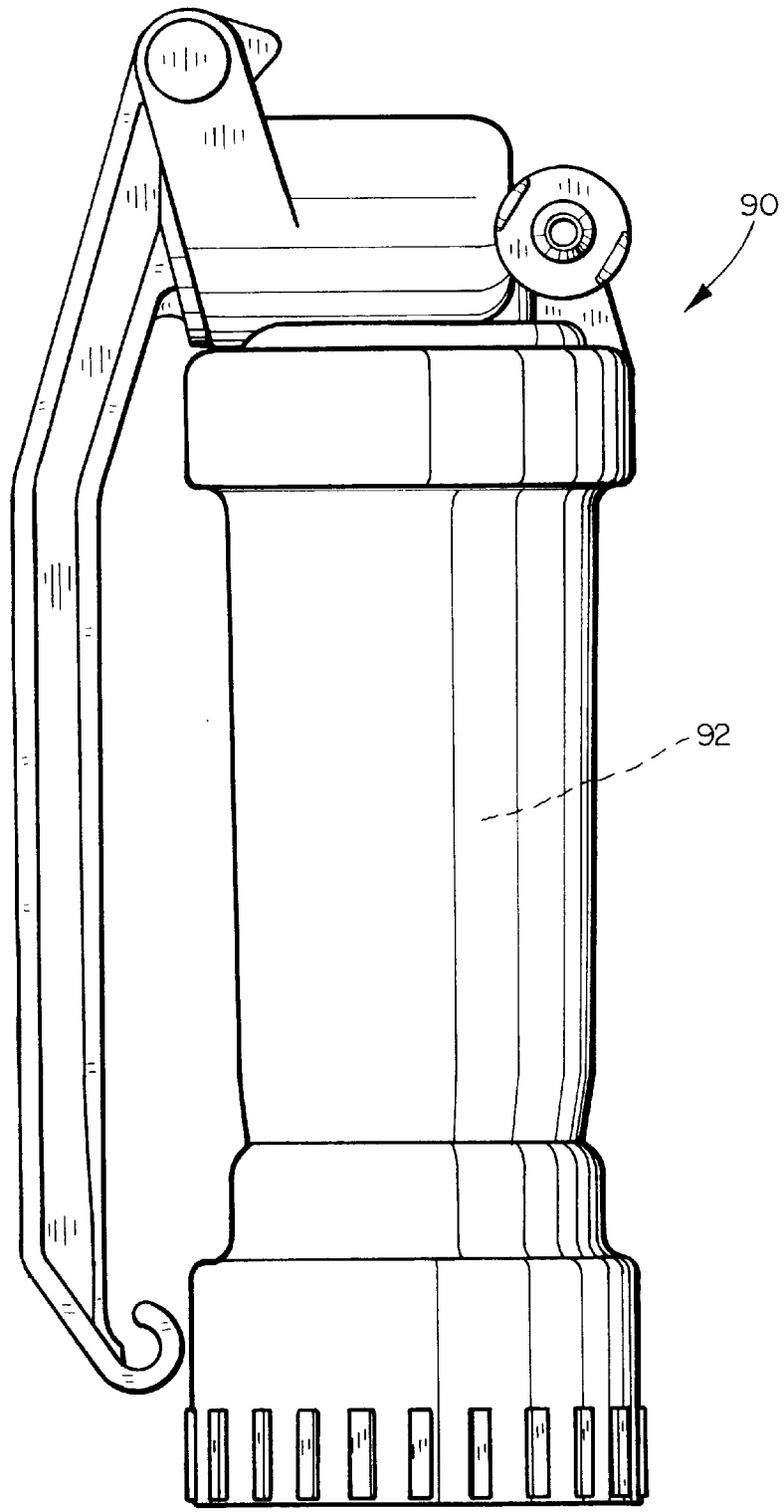
FIG. 7 is a side elevation view of one particular end use for a tubular ceramic filter media manufactured according to the method of the present invention.

FIG. 7 shows one type of a portable water filter in which a tubular ceramic filter media manufactured according to the process of the present invention can be utilized. The filter 90 is merely representative of the type of portable water filter in which the filter media manufactured by the inventive process can be utilized. The tubular ceramic filter media is mounted within an internal chamber 92 sized to accommodate the filter media.

Without limiting the scope or nature of the present invention, the following example is provided to further explain the ceramic filter media manufacturing process of the present invention:

EXAMPLE

A 25 kg (dry weight basis) batch of ceramic materials was mixed prior to extrusion. The following amounts of the various constituent materials were mixed in the 25 kg batch:

20 kg Diatomaceous Earth 5 kg Clay 12.5 kg Water 12.5 kg Gel 0.125 kg Sodium Stearate The gel was prepared by mixing water with 5% Methocel™ powder. The powder was first dispersed in hot water, and then gelled by quenching the solution with cold water. Thus, the dry weight of the batch was 25 kg, and the actual weight of all of the constituents in the batch was 50.125 kg. The constituent materials were introduced into a muller-type mixer and mixed for approximately one hour. The mixture of constituents was then introduce into the hopper of the extruder and subsequently extruded in a tubular structural form. The tubes were extruded intermittently at a rate of approximately 60 feet per minute. The tubular filter media were cut to a length of approximately two feet after extrusion. The tubular filter media were received manually by a V-shaped member approximately three feet in length for careful handling and placement upon a roller-drier apparatus. The tubular filter media were rotated on the rollers at approximately one rpm, while exposed to low heat and moving air, for approximately 12 to 16 hours. The dried tubes were then placed in a kiln for firing. The kiln was heated for three hours in a ramp-up mode, increasing the heat from room temperature to approximately 1832 degrees Fahrenheit. The tubes were fired at approximately 1832 degrees Fahrenheit for approximately two hours. Subsequently, the kiln and tubes inside were allowed to cool in an unassisted manner. The entire firing process lasted approximately 12 hours. Finally, the resulting tubes were cut to a length of approximately 3.870 inches for use in portable water filters. The outside diameter achieved was approximately 1.675 inches and the wall thickness of the ceramic filter media was approximately 0.25 inches.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of manufacturing a ceramic filter media for use in connection with a water filter, comprising:

providing ceramic raw materials comprising diatomaceous earth and clay;

providing a plurality of extrusion-aid materials;

mixing the ceramic raw materials and the extrusion aid materials to form a mixture of constituent materials;

extruding the mixture of constituent materials to form a filter media comprising a first end, a second end, and an inner cavity extending from the first end to the second end;

drying the extruded filter media;

firing the extruded filter media to create a ceramic filter media.

2. A method of manufacturing a ceramic filter media for use in connection with a water filter, comprising:

providing ceramic raw materials comprising diatomaceous earth and clay;

providing a plurality of extrusion-aid materials;

mixing the ceramic raw materials and the extrusion aid materials to form a mixture of constituent materials;

extruding the mixture of constituent materials to form a cylindrical filter media comprising a first end, a second end, and an inner cavity extending from the first end to the second end;

drying the extruded filter media;

firing the extruded filter media to create a ceramic filter media.

3. A method of manufacturing a ceramic filter media for use in connection with a water filter, comprising:

providing ceramic raw materials comprising diatomaceous earth and clay;

providing a plurality of extrusion-aid materials;

mixing the ceramic raw materials and the extrusion aid materials to form a mixture of constituent materials;

extruding the mixture of constituent materials to form a cylindrical, tubular filter media comprising a first end, a second end, and an inner cavity extending from the first end to the second end, the filter media having a substantially constant outside diameter;

drying the extruded filter media to preserve the substantially constant outside diameter;

firing the extruded filter media to create a ceramic filter media.

4. A method of manufacturing a ceramic filter media for use in connection with a water filter, comprising:

providing ceramic raw materials comprising diatomaceous earth and clay;

providing a plurality of extrusion-aid materials;

mixing the ceramic raw materials and the extrusion aid materials to form a mixture of constituent materials;

extruding the mixture of constituent materials to form a cylindrical, tubular filter media comprising a first end, a second end, an inner cavity extending from the first end to the second end, and a wall having a predetermined thickness, the wall thickness being substantially constant;

drying the extruded filter media to preserve the substantially constant wall thickness;

firing the extruded filter media to create a ceramic filter media.

5. A method of manufacturing a ceramic filter media for use in connection with a water filter, comprising:

providing ceramic raw materials comprising diatomaceous earth and clay;

providing a plurality of extrusion-aid materials;

mixing the ceramic raw materials and the extrusion aid materials to form a mixture of constituent materials;

extruding the mixture of constituent materials to form a filter media having a first end, a second end, and a cavity extending from the first end to the second end;

drying the extruded filter media;

firing the extruded filter media to create a ceramic filter media;

cutting the ceramic filter media to a desired length;
wherein the ceramic filter media requires no milling to achieve tolerances necessary for use in a water filter.

* * * * *